United States Patent [19]
Costello

[11] Patent Number: 5,385,598
[45] Date of Patent: Jan. 31, 1995

[54] METHOD AND APPARATUS FOR ISOLATING A METALLIC COMPOUND WITHIN A MOLTEN BATH

[75] Inventor: Bernard J. Costello, Princeton, N.J.
[73] Assignee: Argus International, Ringoes, N.J.
[21] Appl. No.: 57,319
[22] Filed: May 5, 1993
[51] Int. Cl.$^6$ ............................................. C22B 21/06
[52] U.S. Cl. ................................................. 75/10.11
[58] Field of Search ....................................... 75/10.11
[56] References Cited

U.S. PATENT DOCUMENTS 5,110,352 5/1992 Toyoda ............................ 75/10.11

Primary Examiner—Peter D. Rosenberg
Attorney, Agent, or Firm—Louis Weinstein

[57] ABSTRACT

A molten metallic composition containing an undesirable concentration of a metallic element is heated in a vessel whose depth is greater than its width. The vessel is heated to have a temperature gradient such that the upper region of the vessel is at a greater temperature than the lower region(s). When the metallic element to be removed from the molten composition reaches a desired saturation level in the liquid metallic composition, the temperature gradient is reversed causing the formation of an intermetallic compound containing the metallic element. The intermetallic compound precipitates out as a solid material thereby facilitating its removal. The intermetallic content at the lower regions of the vessel are also controlled so that their composition contains a significantly reduced amount of the metallic element which has been precipitated out of the upper region. The method may be employed to alter concentrations at levels of metallic material in which an intermetallic compound is formed having a density greater than the liquid metallic composition. This method concludes with the step of "freezing" the molten material to retain the desired concentrations at different regions along the height of the solid block formed thereby.

23 Claims, 1 Drawing Sheet

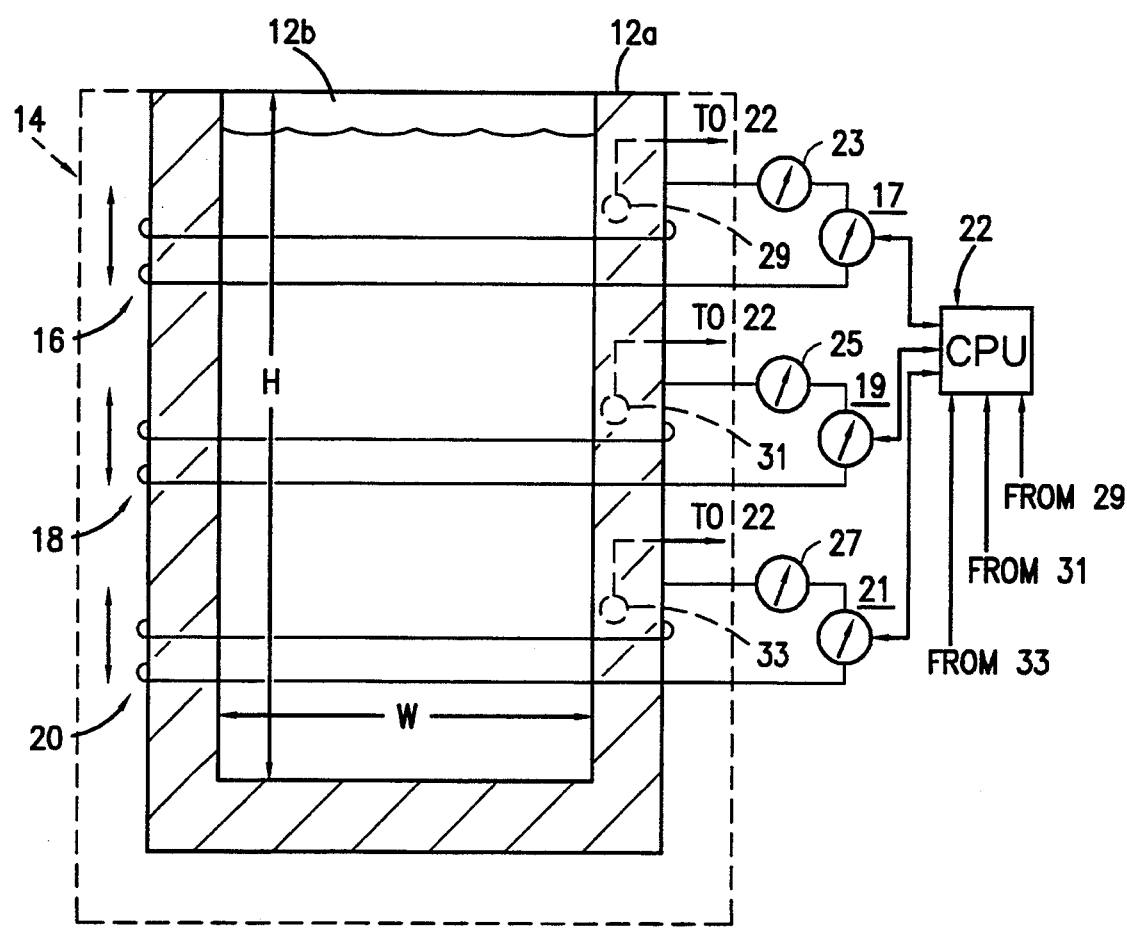

METHOD AND APPARATUS FOR ISOLATING A METALLIC COMPOUND WITHIN A MOLTEN BATH

FIELD OF THE INVENTION

The present invention relates to separation of intermetallic compounds such as, for example, tin-copper from tin-lead solder and more particularly to a novel method and apparatus for removing copper from the molten solder.

BACKGROUND OF THE INVENTION

Tin-lead solders are commonly employed to provide interconnections in electronic circuitry such as between the terminals of integrated circuits and wiring pads provided upon printed wiring boards, to name just one typical application.

Electronic machines used to interconnect such electronic components and circuits to one another employ a variety of processes relating to electronic soldering, which typically utilizes solder in the molten state.

Substantially all of such processes utilize copper surfaces initially wetted by the solder to form an intermediary structure in order to produce a good electrical connection between the surfaces being joined.

One of the inherent elements of soldering is the employment of a suitable molten solder. Molten solder is corrosive and thus causes a small amount of copper from the wetted surfaces to be taken up in solution in the molten (liquid) solder. Copper in solution is tolerable up to a concentration of 0.3 percent by weight at typical soldering temperatures. Above this level, copper becomes saturated and precipitates as a tin-copper intermetallic compound, which is a crystalline structure having a needle-like configuration which produces rough and gritty solder.

The solubility of copper in solder is a function of temperature and solder composition. As temperature increases, copper solubility increases. As tin content increases, the solubility also increases. The solder of principle interest for electronic soldering is 63/37 (the eutectic alloy), which is comprised of sixty-three percent by weight of tin and thirty-seven percent by weight of lead. The following discussion will refer to the 63/37 alloy.

The limit of solubility of copper in solder is referred to as the saturation point which is expressed as percent by weight of copper in the molten solder bath at a specific temperature. A solder bath is said to be in equilibrium when the percent of copper in the bath is at the saturation point. The formation of a tin-copper intermetallic compound begins at the saturation point and progresses as the temperature of the molten bath is reduced. If a particular molten solder composition is in equilibrium at a particular temperature, then excess crystals will be apparent as floating solids and the liquid solder will be in equilibrium.

It is thus advantageous to remove copper from the molten bath and/or to reduce its percent weight in the molten bath to significantly reduce and/or eliminate the presence of rough and gritty solder due to the presence of an undesirable excess of copper.

BRIEF DESCRIPTION OF THE INVENTION

The present invention provides a method and apparatus for enabling copper to be removed from tin-lead solder by precipitation to reduce the amount of copper present to a level below saturation at the melting point of the solder.

The saturation point of molten solder increases with temperature. In a given bath of solder, copper selectively migrates by diffusion to that portion of the molten bath which is at the highest temperature. That is, the saturation point will be higher at the higher temperature region and the capacity of solder to carry copper in solution in the higher temperature region is greater than such capacity in a lower temperature region.

The method and apparatus of the present invention utilize an open-ended vessel whose depth is greater than its width and which is insulated to minimize heat loss through the wall of the vessel and restrict heat loss through the upper open end of the vessel. Heating means are provided to selectively obtain different temperature levels at different vertical regions of the vessel.

The vessel is initially heated so that a higher temperature is achieved in the upper region of the vessel than that obtained in the lower region. When a desired higher temperature is reached, the heating means for the various vertical regions is modified (i.e. reduced) or turned off enabling the vessel to cool through the open end. The insulation of the vessel limits egress of heat energy to the upper open end of the vessel thus providing a temperature gradient which is reverse the temperature gradient provided during initial heating. Since energy transfers only down a temperature gradient, the higher end of the liquid composition cools down before the lower end and before the lower end loses energy.

The reverse temperature gradient causes copper-rich solder near the upper end of the vessel to become saturated before the lower end, whereupon the tin-copper intermetallic compound precipitates out as a solid material. Since the intermetallic compound has a density lower than that of tin-lead solder the tin-copper floats on the surface of the molten bath to facilitate simple and rapid removal.

In addition to increasing the ability of the solder to carry copper, i.e. to increasing the saturation point and then reversing the temperature gradient to expel copper by precipitation the lower regions within the vessel become "starved" of copper with the net result that copper content is reduced to a level lower than the saturation point normally experienced in tin-lead solder. Although the example given hereinabove has been utilized for precipitating out copper from a bath of tin-lead in liquid form, the method is applicable to a variety of solder compositions and to metals and alloys other than copper and tin-lead solders and for example is applicable to processes wherein an objective is the concentration of particular intermetallic compounds within a particular region of a molten bath. Such objectives are applicable where the bath is subsequently frozen without removal of the precipitate or alternatively where the precipitate is removed with a portion of the molten metal to achieve a concentrated composition.

OBJECTS OF THE INVENTION

It is, therefore, one object of the present invention to provide a novel method and apparatus for removing and/or reducing and/or altering the concentration of a metallic element within a body of a liquid metallic composition.

Still another object of the present invention is to provide a novel method and apparatus for eliminating and/or substantially reducing the concentration of a metallic element from a body of a liquid metallic material.

Still another object of the present invention is to provide method and apparatus for removing and/or reducing the concentration of copper within a liquid solder to a level which eliminates the harmful effects of copper.

Still another object of the present invention is to provide novel apparatus for obtaining a first temperature gradient within a vessel during an initial stage of a removal process and thereafter reversing the direction of the temperature gradient to achieve the above-mentioned results.

The above, as well as other objects of the present invention will become apparent when reading the accompanying description and drawing in which:

BRIEF DESCRIPTION OF THE FIGURE

The sole Figure is a simplified diagrammatic view of apparatus employed for practicing the novel method of the present invention.

DETAILED DESCRIPTION OF THE INVENTION AND PREFERRED EMBODIMENTS THEREOF

Apparatus 10 utilized for practicing the novel method of the present invention is comprised of a vessel 12 which is preferably of a cylindrical shape, although any other cross-sectional configuration may be used such as square, rectangular, hexagonal, octagonal, oval, etc. Vessel 12 is formed of a metallic material of good conductivity and one which is able to withstand the temperatures to which the molten material placed in the vessel is heated. A layer (or layers) of a suitable insulation is placed about the sides and bottom of vessel 12 to limit the escape of heat energy through the open top 12a of the vessel.

The insulation 14 has been shown dotted in order to facilitate the display and explanation of the heating means which, in the preferred embodiment, is comprised of a plurality of heating coils 16, 18 and 20. Each of the heating coils is provided with separate energy sources 17, 19 and 21 for respectively controlling the heating of the vessel. The heating coils may be formed of any suitable material such as a suitable resistive material generating heat as a function of current passing through the coil. The number of turns of the coils are merely exemplary and an appropriate number of turns and the provision of a coil of the appropriate resistivity may be selected in order to obtain the desired heating levels. The number of heating coils may be greater or less than the number shown in the sole Figure.

As was pointed out hereinabove, in 63/37 alloy (containing, by weight, sixty-three percent tin and thirty-seven percent lead), a concentration of the order of 0.3 percent by weight of copper is tolerable. However, concentrations in excess of this value cause the copper to become saturated and precipitate out as a tin-copper intermetallic compound, the crystalline structure of such compound assuming a needle-like configuration which results in a solder which is rough and gritty.

Solubility of copper within the liquid alloy is a function of the solder composition and temperature.

The solubility limit of copper and solder is referred to as the saturation point which is expressed as a percent by weight of copper in the solder bath at a specific temperature. A solder bath is said to be in equilibrium when the percent of copper (by weight) is at the saturation point. The formation of a tin-copper intermetallic compound begins at the saturation point and progresses as the temperature of the liquid bath is reduced. If a particular molten solder composition is at equilibrium at a given temperature, then excess crystals will be apparent since they take the form of floating solids whereas the liquid solder will be in equilibrium.

Copper may be removed from tin-lead solder by precipitation to a level below saturation at the melting point.

When solder is in molten form, the saturation point of the copper increases with temperature. In a given bath of solder, copper will selectively migrate by diffusion to that region of the bath having the highest temperature. More specifically, the saturation point will be higher at a higher temperature region and thus the capacity of solder to carry copper in solution is greater in the higher temperature region than the capacity in a lower temperature region.

The process is as follows:

Molten solder is heated within the interior 12b of vessel 12 whose height is not less than and is preferably greater than its width. A preferred range of height to width (H/W) relationship is $1.0 \leq H/W \leq 5$. Insulation 14 minimizes heat loss through the bottom and side walls of the vessel thereby urging heat loss through the upper, open end 12a.

Power sources 17, 19 and 20 are regulated to provide a temperature gradient measured in the vertical direction which is a function of the phase of the process. A controller 22, such as a CPU, may be utilized to control the power output at each power source as well as the time period each power source is maintained at the desired power level(s). Sensors 29, 31 and 33 provide feedback information to CPU 22 for accurate control.

During the initial heating phase, the heating coils are designed to heat the upper end of the vessel faster than the lower end in order to achieve a higher temperature near the upper end region of the vessel than the temperature level at the lower end thereof. For example, the energy source 21 may provide a low electrical energy output, the intermediate power source 19 may provide an intermediate energy level output which is greater than the output energy level of source 21 and the source 17 may provide energy at an output level greater than that of source 19. As a result of the temperature gradient measured in the vertical direction, copper will migrate by diffusion to the upper end of vessel 12, which is the hotter region. The temperature of the upper end is elevated substantially higher than the melting point of solder which is of the order of 183° C. Copper will thus migrate by diffusion to the upper end of vessel 12, which is the hotter region within the vessel. When the desired higher temperature is reached, and is maintained for a period sufficient to assure migration of a satisfactory amount of copper, the output energy of the heating means is reduced or turned off, allowing the entire vessel to cool.

The vessel insulation 14 restricts the primary path of heat energy loss to the upper, open end of the vessel.

Since energy transfers only down a temperature gradient, the higher end of the vessel cools to a temperature below the temperature at a lower region before the lower region of the vessel loses energy, which creates a reversal of the initial temperature gradient in the vessel.

Summarizing, during the initial heating stage the upper region of the vessel is hotter while during the cooling stage the upper region of the vessel is cooler.

Reversal of the temperature gradient causes copper-rich solder in the top region to become saturated before saturation occurs in the lower regions whereby the tin-copper intermetallic compound precipitates out as a solid material. The tin-copper intermetallic compound has a lower density than tin-lead solder, causing the solid material to float at the surface of the liquid bath thereby facilitating rapid, easy removal by skimming, for example.

A further benefit of the above process is that by increasing the temperature in the upper region (such as by controlling the energy source 17), the increased temperature increases the capacity of the molten tin-lead to carry copper, i.e. increases the saturation point. Reversing the temperature gradient in order to expel copper by precipitation causes the cooler regions in the lower end of the vessel to become starved of copper with the net result being the reduction of copper content at a temperature level which is lower than the saturation point normally encountered in tin-lead solder. For example, the saturation point for solid tin-lead solder having a composition of sixty-three percent tin/thirty-seven percent lead, is 0.20 percent. The employment of the method and apparatus of the present invention makes it possible to achieve a solder composition having a saturation point of less than 0.17 percent.

The working temperatures and times of one exemplary embodiment are as follows:

Heating sources 21, 19 and 17 were operated to provide a temperature gradient of 24° C. from the top to the bottom of the vessel. This gradient was maintained for a period of two hours.

Thereafter, the temperature sources were turned off. Copper-tin intermetallic compound started to appear at the surface of the molten bath when the top temperature reached 214° C. and a gradient of 2° C. was apparent. Further cooling produced greater amounts of precipitate which were removed as they accumulated. The ultimate condition was achieved when the temperature approached 185° C., slightly above the melting point of the eutectic solder.

Thereafter, the temperature of the molten bath was maintained at a level sufficient to retain the liquid in its molten form (i.e., $\geq 183°$ C.).

Although the procedure described hereinabove has detailed the manner in which copper may be removed from tin-lead solder, it should be noted that the procedure is applicable to a variety of solder compositions and to metals and alloys other than copper and tin-lead solders. The method and apparatus of the present invention may also be applicable to processes wherein the objective is to concentrate particular intermetallic compounds in a particular region of a molten bath. Such objectives are applicable where the bath is subsequently frozen without removal of the precipitate or in applications wherein the precipitate is removed with a portion of the molten metal to achieve a concentrated composition.

For example, if the intermetallic compound is more dense that the liquid metallic composition, the intermetallic compound will descend by gravity into the lower regions of the vessel. The desired saturation levels at these regions are maintained by freezing the liquid composition, i.e. by cooling the liquid metallic composition to a temperature below its melting point, to retain the concentrations at each region of the solid block of material.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described. For example, the vessel may be provided with a greater or lesser number of independent heating means. The heating means may be of either the AC or DC type. In addition, each energy device 17, 19 and 21 may be coupled to a constant current source and be provided with an adjustable resistance element 23, 25, and 27 respectively for controlling the magnitude of the current passing through the heating coils and thereby controlling the temperature. The resistance elements may be adjusted under control of CPU 22. As a further alternative, the heating coils may each be powered by a constant energy source and arranged to be movable vertically up or down along the outer periphery of the vessel to obtain the desired temperature gradient. The temperature is adjusted by moving the coils closer to one another (for higher temperature) near the top of the vessel or further apart (for reducing temperature). The lower regions of the vessel may be made cooler because of the wider spacing between coils and by positioning all of the coils close to the upper end of the vessel.

What is claimed is:

1. A method for altering the concentration of a selected metallic element within a liquid metallic composition containing at least two metallic element constituents, this method comprising the steps of:
   (a) placing a molten material including the liquid metallic composition containing said selected metallic element within a vessel having an upper end, a lower end, adjacent horizontal regions between said upper end and said lower end of said vessel, and an open top at said upper end;
   (b) heating said vessel to obtain a temperature gradient extending between said upper end and said lower end of said vessel, whereby the temperature at an upper region, near the upper end of the vessel is greater than the temperature at adjacent regions below said upper region, the temperature of said upper region being sufficient to cause the metallic element whose concentration is desired to be altered to migrate from lower temperature regions toward a higher temperature region;
   (c) maintaining the aforesaid temperature gradient for a period sufficient to enable a desired amount of said metallic element to migrate to said higher temperature region;
   (d) reducing temperatures in each said region to reverse the temperature gradient established in step (b) so that the temperature of the upper region is reduced to a level sufficient to enable said metallic element to form an intermetallic compound with at least one of the constituents of the metallic liquid composition whereby said intermetallic compound migrates through the vessel in a direction which is a function of a density of the intermetallic compound relative to a density of the liquid metallic composition to thereby concentrate the intermetallic compound in a given region within the vessel.

2. The method of claim 1 wherein the intermetallic compound in said molten material rises when its density is less than the density of the liquid metallic composition, said method further comprising:

(e) removing the intermetallic compound which has collected at an upper region of the molten material.

3. The method of claim 1 further comprising:
(f) maintaining the temperature of the molten material in the vessel at a level sufficient to maintain the contents of the vessel in a molten state.

4. The method of claim 1 wherein the intermetallic compound descends in the vessel when its density is greater than the liquid metallic composition, said method further comprising the step of cooling the contents of the vessel to retain the concentration of the intermetallic compound in the lower region of the vessel.

5. The method of claim 1 wherein step (b) further comprises the steps of providing separate electrical heating means for at least an upper and a lower region of said vessel, and adjusting power delivered to said separate heating means to obtain a desired temperature gradient.

6. The method of claim 5 wherein step (e) further comprises the step of either reducing the energy levels delivered to said heating coils or turning off the energy level sources completely to obtain the desired reversal of the temperature gradient and the reduction of the temperature level in step (e).

7. The method of claim 5 wherein step (e) further comprises the step of providing a plurality of heating coils about an outer periphery of the vessel and arranging the coils near the upper region of the vessel and spaced apart by distances selected to obtain the desired temperature gradient.

8. The method of claim 3 wherein step (a) further comprises providing a vessel having a depth which is greater than the width of said vessel and insulating the bottom and sides of said vessel to minimize heat energy lost through the walls of said vessel and thereby concentrate heat energy loss through the top open end of said vessel to facilitate reversal of the temperature gradient obtained during step (e) when said electrical energy sources are either turned down or turned off.

9. The method of claim 1 wherein the liquid metallic composition is a solder composition.

10. The method of claim 9 wherein said solder composition is comprised of a tin-lead composition.

11. The method of claim 10 wherein said tin-lead composition is comprised of sixty-three percent by weight of tin and thirty-seven percent by weight of lead.

12. The method of claim 10 wherein the temperature level of the upper region obtained during step (b) is sufficient to reduce the amount of copper by weight in said liquid composition to less than 0.3 percent.

13. The method of claim 10 wherein the temperature level of the upper region obtained during step (b) is sufficient to reduce the amount of copper by weight in said liquid composition to a region of between 0.3 percent and 0.17 percent by weight.

14. The method of claim 10 wherein the temperature level obtained during step (b) is sufficient to reduce the amount of copper by weight in said liquid composition to a level which is sufficient to prevent the tin-lead composition from producing rough, gritty solder.

15. The method of claim 1 wherein steps (a) through (g) are performed as a batch process to form one batch at a time of a molten liquid composition containing a reduced concentration of said metallic element is said liquid metallic composition.

16. A method for altering a concentration of a selected metallic element contained in a liquid metallic composition containing at least two constituent metallic elements, said method comprising the steps of:
(a) providing a molten material including the liquid metallic composition containing said selected metallic element within a vessel having an upper end, a lower end, and adjacent horizontal regions between said upper end and said lower end of said vessel, and an open top at said upper end;
(b) heating said vessel to obtain a temperature gradient extending between said upper end and said lower end of said vessel whereby a temperature of the molten material at an upper region, near the upper end of the vessel, is greater than a temperature at adjacent regions below said upper region, the temperature of said upper region being sufficient to cause the metallic element whose concentration in the composition is desired to be reduced to migrate from lower temperature regions toward a higher temperature region;
(c) maintaining the temperature regions toward a higher temperature region;
(c) maintaining the temperature gradient obtained in step (b) for a period sufficient to enable a desired amount of said metallic element to migrate to said higher temperature region;
(d) reducing temperatures in each said region and reversing the temperature gradient established in step (b) so that the temperature of the upper region is reduced by a level sufficient to enable said metallic element to form an intermetallic compound with at least one of the constituents of the metallic liquid composition, said intermetallic compound having a higher density than the liquid metallic composition, whereby the intermetallic compound descends to a lower region of the molten material; and
(e) reducing the temperature of the molten material in the vessel to a level sufficient to freeze the contents of the vessel and thereby maintain the concentration of the metallic element in each of said regions obtained at step (d).

17. Apparatus for substantially isolating a first metallic element contained in a liquid metallic composition formed of second and third metallic elements different from said first metallic element comprising:
a metallic vessel having a bottom and integral side walls terminating to form an open top;
the depth of said vessel being at least greater than the diameter of said vessel;
at least two separate heating means surrounding the periphery of said vessel for heating the vessel and its contents;
the side walls and bottom of said vessel being insulated to reduce heat energy loss through the bottom and side walls of said vessel and thereby concentrate heat energy lost through the top open end thereof;
means for adjusting the heating means to initially obtain a temperature gradient of a molten material in said vessel measured along a vertical axis so that the temperature gradient is maximum near an upper region of said vessel and is minimum near a lower region thereof; and
means for one of reducing and turning off said power sources to obtain a reversal of the first-mentioned temperature gradient sufficient to enable the temperature in the upper region to be reduced to a level to cause said first metallic element to form an intermetallic compound with one of said second and third metallic elements, said intermetallic compound being of a lower density than the liquid metallic composition whereby the intermetallic compound is caused to float to the surface of the contents of the vessel.

18. The apparatus of claim 17 wherein said heating means comprise coils adjustable along the height of the vessel and spaced apart to obtain a desired temperature gradient.

19. The apparatus of claim 17 wherein the heating means are adjusted by adjusting a power output of a power source coupled to each coil.

20. The apparatus of claim 17 further comprising means for maintaining the temperature of the vessel content to a level sufficient to maintain the contents of the vessel in the molten state.

21. Apparatus for altering the concentration of a first metallic element at different regions of a liquid metallic composition formed of second and third metallic elements different from said first metallic element comprising:

a metallic vessel having a bottom and integral side walls terminating to form an open top;

the depth of said vessel being at least equal to and preferably greater than the diameter of said vessel;

at least two separate heating means surrounding the periphery of said vessel for heating the vessel and its contents;

the side walls and bottom of said vessel being insulated to reduce heat energy loss through the bottom and side walls of said vessel and thereby concentrate heat energy lost through the top open end thereof;

means for adjusting the heating means to initially obtain a temperature gradient of a molten material in said vessel measured along a vertical axis so that the temperature gradient is maximum near an upper region of said vessel and is minimum near a lower region thereof; and means for one of reducing and turning off said power sources to obtain a reversal of the first-mentioned temperature gradient sufficient to enable the temperature in the upper region to be reduced to a level to cause said first metallic element to form an intermetallic compound with one of said second and third metallic elements, said intermetallic compound being of a greater density than the liquid metallic composition whereby the intermetallic compound is caused to descend to lower regions of the contents of the vessel; and means for operating the power sources to cool the contents of the vessel to a level below the liquification level of said contents.

22. The apparatus of claim 21 wherein said heating means comprise coils adjustable along the height of the vessel and spaced apart to obtain a desired temperature gradient.

23. The apparatus of claim 21 wherein the heating means are adjusted by adjusting a power output of a power source coupled to each coil.

* * * * *